June 14, 1938.  C. A. BROWN ET AL  2,120,853
APPARATUS FOR SEVERING GLASS ROD AND TUBING
Filed July 29, 1936  3 Sheets-Sheet 1
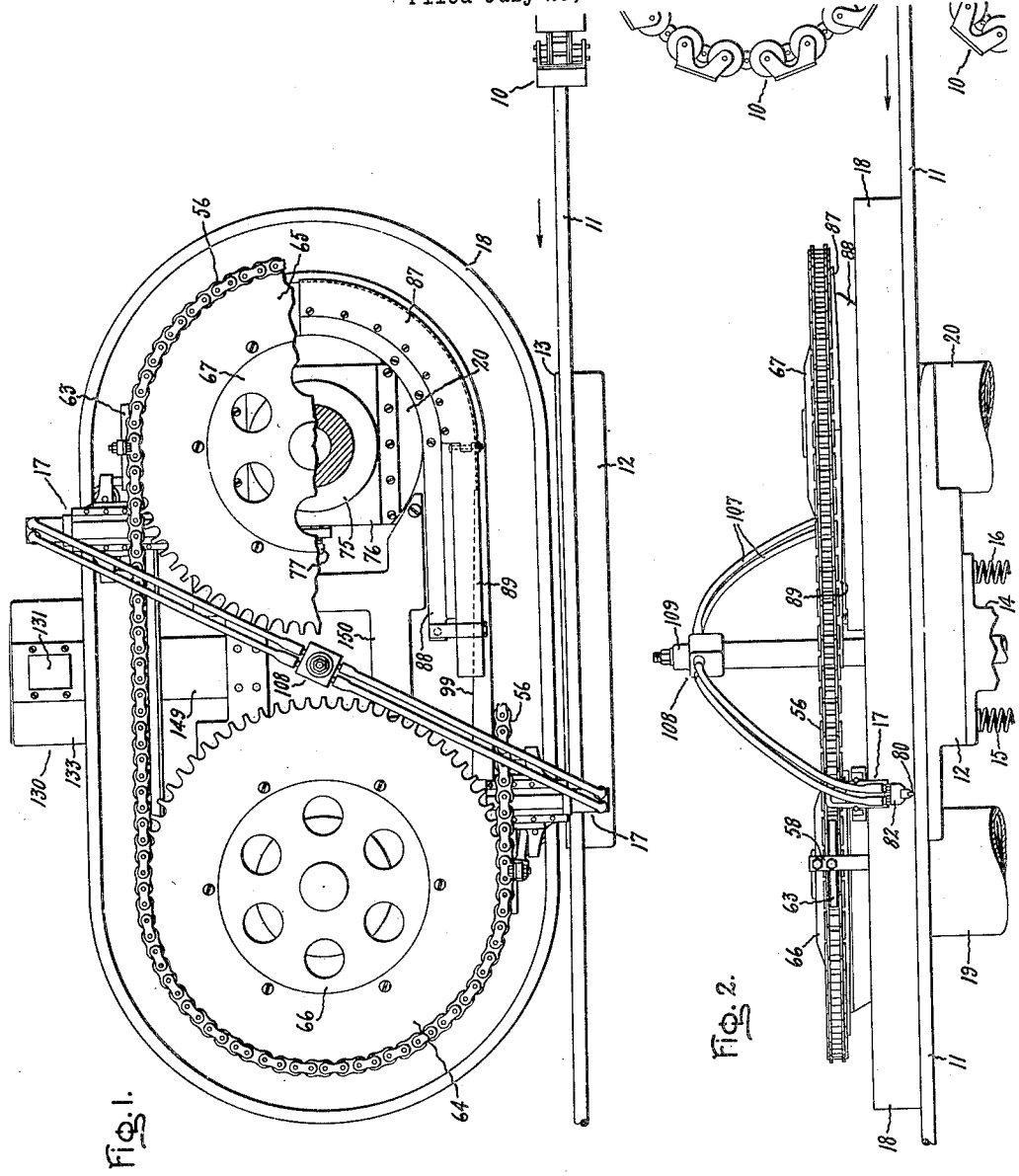
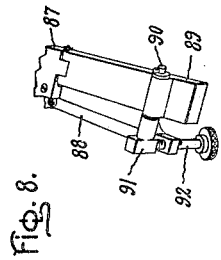
Inventors:
Carl A. Brown,
Clarence E. Hahn,
by Harry E. Dunham
Their Attorney.

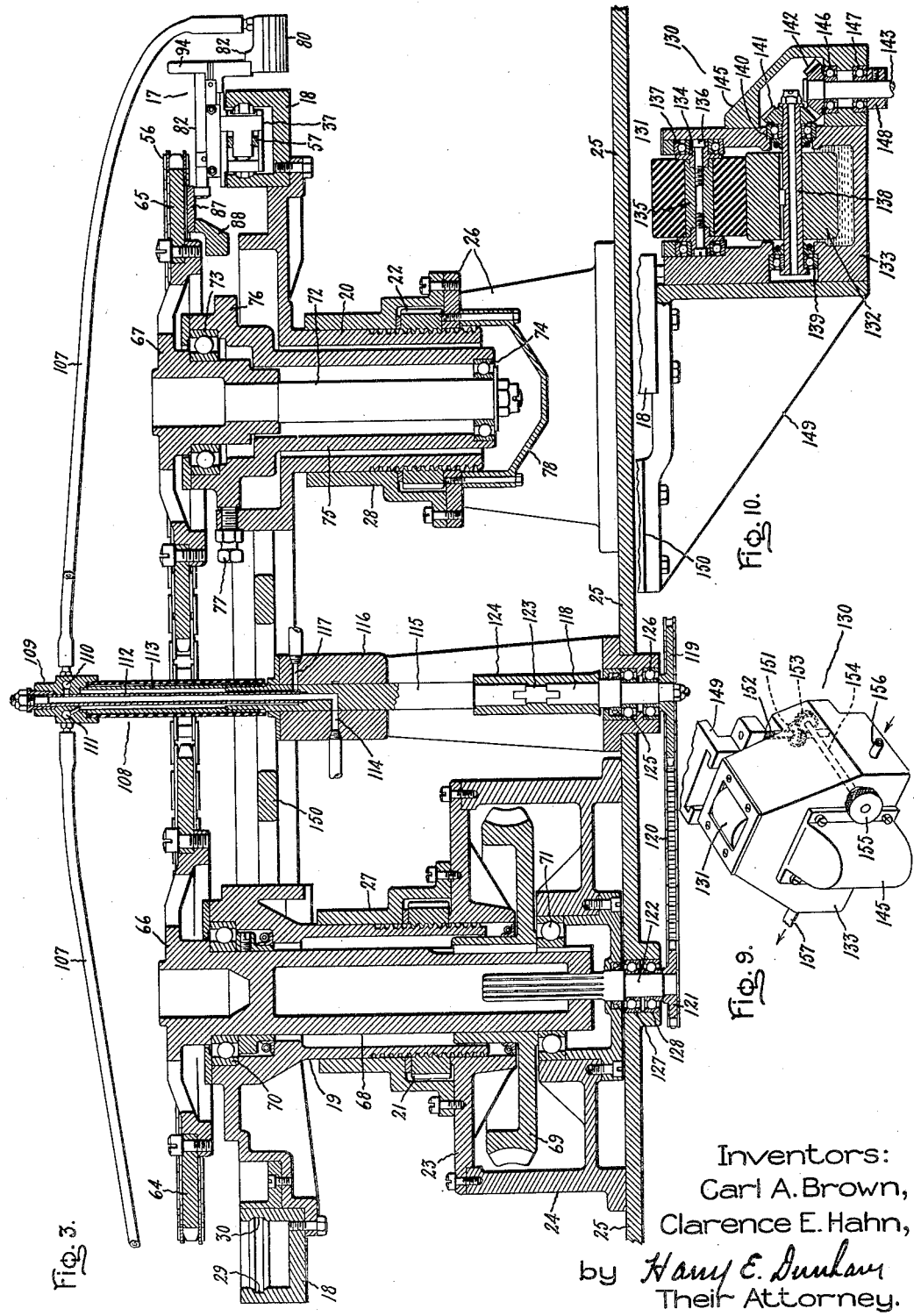

June 14, 1938.    C. A. BROWN ET AL    2,120,853
APPARATUS FOR SEVERING GLASS ROD AND TUBING
Filed July 29, 1936    3 Sheets-Sheet 3

Inventors:
Carl A. Brown,
Clarence E. Hahn,
by Harry E. Dunham
Their Attorney.

Patented June 14, 1938

2,120,853

UNITED STATES PATENT OFFICE

2,120,853

APPARATUS FOR SEVERING GLASS ROD AND TUBING

Carl A. Brown, Chardon, and Clarence E. Hahn, Cleveland, Ohio, assignors to General Electric Company, a corporation of New York Application July 29, 1936, Serial No. 93,238

7 Claims. (Cl. 49—48)

Our invention relates to apparatus for severing vitreous tubing or rod and more particularly to apparatus adapted for use in connection with apparatus for carrying out the method disclosed in Danner Patent 1,218,598 of March 6, 1917, to sever the tubing or rod as it is drawn at a high rate of speed and while it is in a heated condition.

One type of severing apparatus is disclosed in Hahn Patent 1,990,375 of February 5, 1935, and comprises a cutter which is moved intermittently in a vertical plane to contact the tubing or rod. Owing to the construction of the cutter and to the direction of its movement, that apparatus has the objection that moisture is thrown at times upon the tubing or rod. Our apparatus obviates that objection by reason of the fact that the movement of the cutter is in a horizontal rather than a vertical plane, and also on account of the provision of improved moistening means.

In another type of apparatus the cutting mechanism is supported by an endless belt, such as disclosed in application Serial No. 731,662, filed June 21, 1934, Brown et al., and is open to the objection that there is a tendency of the cutting mechanism to vibrate and get out of alignment. Our apparatus obviates this by providing a stationary endless track for supporting the cutting mechanism at all times. Other features and advantages of our invention will be apparent from the detailed description which follows of one species thereof and from the accompanying drawings.

Figure 4:
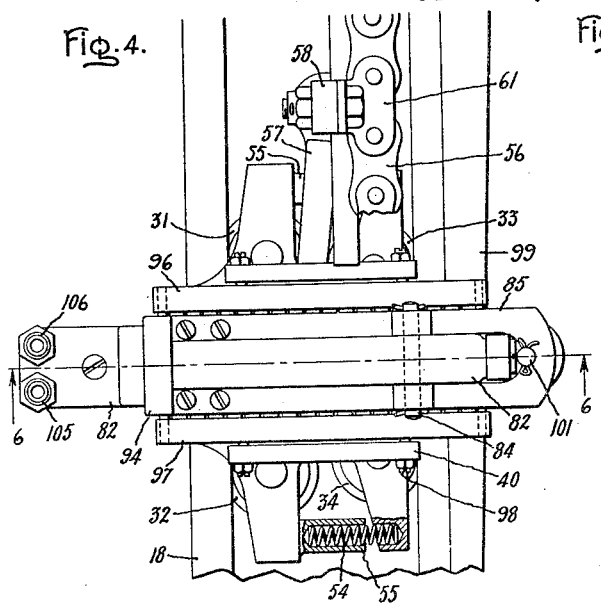
Figure 5:
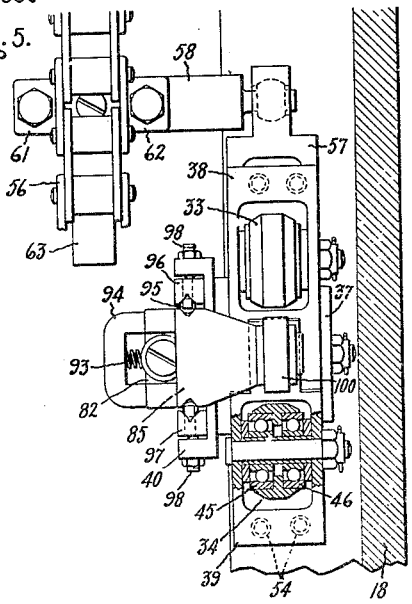
Figure 6:
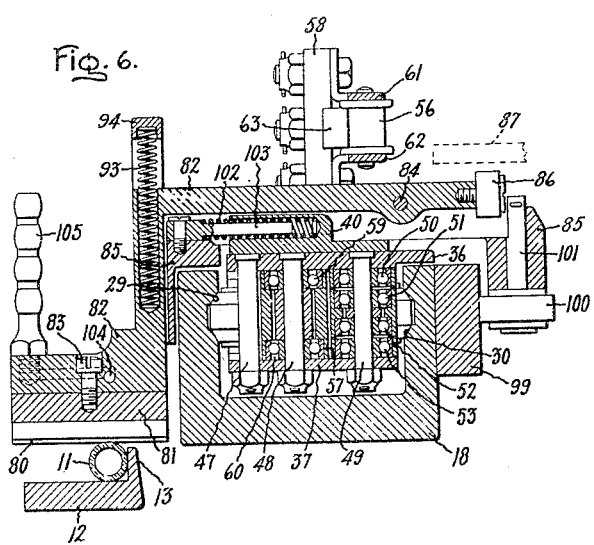
Figure 7:
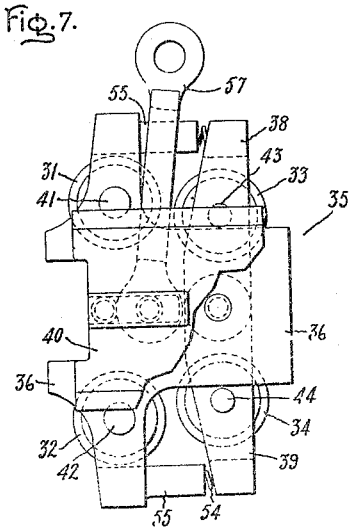

In the drawings, Figs. 1 and 2 are top and side views of the vitreous tubing or rod severing apparatus of our invention; Fig. 3 is a vertical section therethrough; Figs. 4 and 5 are top and side views of cutting mechanism; Fig. 6 is a section through said mechanism along line 6—6 of Fig. 4; Fig. 7 is a plan view of the carriage of said mechanism; Fig. 8 is a perspective view of the adjustable portion of the cam for causing the cutting knife to engage the vitreous tubing or rod; and Figs. 9 and 10 are perspective and sectional views of cutting knife dampening mechanism.

Our apparatus as shown in Figs. 1 and 2, is located adjacent a glass tube or rod drawing machine 10 from which the glass tube 11 in this instance passes to our machine at a uniform rate. The drawing machine 10 is preferably of the type shown in Danner Patent 1,218,598, issued March 6, 1917, which co-operates with other mechanism in manufacturing the vitreous tubing or rod. The vitreous tubing passes onto the rest 12 of our apparatus and slides longitudinally along the rail 13 thereof. The rest 12 is supported through bracket 14 and the springs 15 and 16 which are only partially shown and which permit a limited movement of the rest so as to reduce the shock of the contact of the cutting mechanism with the vitreous tubing 11.

While sliding along the rest 12, the glass tubing 11 is engaged by one of two cutting mechanisms 17 which are moved into position above said tubing 11 and while traveling at the same speed are brought into engagement therewith. The cutting mechanisms 17 are supported by the track 18 which has one portion paralleling the rest 12 and which, as shown in Fig. 3, is mounted on the outwardly extending flanges of posts 19 and 20. The posts 19 and 20 are stationary members and are supported through the gears 21 and 22 respectively which are threaded thereonto and which are turned by mechanism (not shown) to raise or lower the track 18. Gear 21 rests on the cover plate 23 of the housing 24 which is mounted on the bed plate 25. Gear 22 rests on the bracket 26 which is mounted on the bed plate 25. The posts 19 and 20 are held in position by the sleeves 27 and 28 respectively which are attached to the cover plate 23 and the bracket 26 respectively.

The track 18, as shown in detail in Figs. 4, 5 and 6, is U shaped and has grooves 29 and 30 in the vertical portions thereof into which the rollers 31, 32, 33 and 34 of each of the cutting mechanisms 17 fit. These rollers support the entire cutting mechanism 17 and, as shown in Fig. 7, are part of a carriage 35 which consists of the two plates 36 and 37, the arms 38 and 39 and the bracket 40. Rollers 31 and 32 are mounted on pins 41 and 42 respectively which extend between the arms of plates 36 and 37, and rollers 33 and 34 are mounted on the pins 43 and 44 respectively of arms 38 and 39 respectively. As shown in Fig. 5, each roller is provided with a pair of ball bearings 45 and 46. As shown in Fig. 6, the plates 36 and 37 are fastened together by bolts 47, 48 and 49, the latter of which also extends through an end of the arms 38 and 39 which engage said bolt 49 through ball bearings 50, 51, 52 and 53. The rollers 31, 32, 33 and 34 are pressed outwardly into the grooves 29 and 30 in the track 18 by pairs of springs 54 located largely in wells in the blocks 55, said springs being mounted between the arms of the plates 36 and 37 and pressing against the ends of arms 38 and 39. The hinged arms 38 and 39 permit the rollers 33 and 34 to move in and out so that the carriage can negotiate the curved portions of the track 18.

The carriages 35 are moved in the track 18 by the chain 56 which is connected to each by a link 57 and an arm 58 and are caused to travel at the same speed as the vitreous tubing 11 so that the cutting mechanisms 17 carried thereby are held over one point on the tubing 11 when aligned therewith. The link 57 engages the carriage 35 through the ball bearings 59 and 60 and bolt 48 and is attached through a swivel connection to arm 58. The arm 58 is bolted to plates 61 and 62 of the chain 56 and carries a bar 63 which is held against the outside face of the chain rollers to keep said chain 56 from bowing out on turns. The chain 56 passes around the sprockets 64 and 65 which are fastened to separate sprocket centers 66 and 67 respectively. The sprocket 64 is the driving member and its hub 66 is provided with a tubular portion 68 which is engaged by driving means (not shown) through worm gear 69. The assembly including sprocket 64 is supported by the post 19 and housing 24 which are engaged through ball bearings 70 and 71 respectively. The sprocket 65 is the idler and is supported through its hub 67 and the shaft 72 which are supported by the ball bearings 73 and 74 respectively. The ball bearings 73 and 74 are mounted in the housing 75 which has wings 76 (Fig. 1) extending from opposite sides thereof which rest in ways in the flared upper portion of post 20. The tightness of the chain 56 is adjusted by turning bolt 77 which moves the housing 75, the wings 76 of which slide in the ways of post 20. The end of shaft 72 is protected by the housing 78 which is fastened to bracket 26.

The cutting mechanisms 17 are connected to the chain 56 at points directly opposite each other and are actuated by stationary cam surfaces mounted adjacent their path of travel. Each cutting mechanism engages the glass tubing 11 through a knife 80, shown in Fig. 6, which is permanently set in a block 81 attached to lever 82 and which may be of metal such as the cemented tungsten carbide known as "carboloy." The block 81 is held in a close fitting groove in lever 82 to which it is secured by screw 83. The lever 82 is mounted on pin 84 which is pivoted in the slide 85 and is moved so as to lift the knife 80 by engagement of the roller 86 thereon with the cam 87. The cam 87, as shown in Figs. 1 and 3, is located adjacent the right hand sprocket 65 and increases in thickness at the beginning so that the knife 80 is lifted above the glass tubing 11 as it moves into position thereabove. The cam 87 is attached to the bracket 88 which is mounted on the flanged portion of post 20. Upon passing to a position over the glass tubing 11, the knife 80 is gradually allowed to drop thereon as the roller 86 passes onto the upwardly sloping cam 89. As shown in Figs. 1 and 8, cam 89 is pivoted at one end to cam 87 and is adjustably mounted at the other end to bracket 88 by the pin 90, the block 91 and the screw 92. The position of the cam 89 is changed by turning screw 92 in or out of bracket 88. The adjustable feature of the cam 89 allows the knife 80 to be dropped onto the glass tubing 11 at any point therealong regardless of the size of said tubing 11. The knife 80 is pressed against the glass tubing 11 by the spring 93 which is largely located in a well in lever 82 and which engages the U-shaped portion 94 of the slide 85 which extends over the lever 82. The slide 85 is provided with V grooves down both sides which provide raceways for the balls 95 which also engage the V groove raceways of bars 96 and 97. The bars 96 and 97 lie in the carriage bracket 40 and are pressed inwardly so as to hold the slide 85, the balls 95 and the bars 96 and 97 in a unit by the screws 98 threaded in bracket 40. The balls 95 are prevented from rolling out of the V grooves by studs at both ends of said grooves in bars 96 and 97.

Even before the knife 80 contacts the glass tubing 11, it begins to travel sideward toward the center of the apparatus in a scoring movement. This movement is caused by another stationary cam 99 which is fastened to the inside of the track 18 and is engaged by the roller 100 on the slide 85. The roller 100 is attached by means of pin 101 to the slide 85 which is moved on the bearing provided by the balls 95. The spring 102 located in the well of bracket 40 engages the enlarged part of the guide rod 103 which is fastened to the slide 85 and keeps the slide 85 to one side and the roller 100 against the cam 99.

The cutting action of the knife 80 is aided by the chilled and dampened condition thereof which results in the glass tubing 11 either breaking all the way through or being partially broken through and under strains so that it breaks off when pressure is applied to the end of the tubing. The knife 80 is chilled by the circulation of a refrigerant, preferably cold water, through the passage 104 in the lever 82. The water passes to and from lever 82 through the nipples 105 and 106 which are, as shown in Fig. 3, connected by flexible hose 107 to a post 108 located midway between the sprockets 64 and 65. The post 108 is surmounted by a block 109 with passages 110 and 111 therein to which the hose 107 is indirectly connected and is mounted on pipes 112 and 113 (pipe 113 surrounds the former). The refrigerant passes into the passage 110 from pipe 112 through a hole in the side wall thereof and is conducted to the pipe 112 through a passage 114 in the shaft 115 and the bracket 116. The refrigerant passes from passage 111 into the end of pipe 113 directly and flows through said pipe 113 and the opening about pipe 112 in shaft 115 to passage 117 in the shaft 115 and bracket 116. Passages 114 and 117 are connected to the supply and drain respectively of the refrigerant. In order to keep the hose 107 directed toward the cutting mechanisms at all times, the post 115 is turned by means consisting of the shaft 118, sprocket 119, chain 120, sprocket 121 and shaft 122 which are driven from the sprocket center 66. The shaft 118 engages the shaft 115 of the post 108 through the key 123 and the sleeve 124 and the shaft 122 engages the sprocket center 66 through the splined portion thereof which fits into a similarly shaped hole therein. The shaft 118 turns in the ball bearings 125 and 126 carried by bracket 116 and the shaft 122 turns in the ball bearings 127 and 128 held by the bed plate 25.

The knife 80 is dampened by the mechanism 130 (Fig. 1) located on the opposite side of the apparatus from the rest 12 and which is shown in detail in Figs. 9 and 10. The edge of the knife 80 contacts the roll 131 and transfers to it only sufficient moisture for the cutting operation. The roll 131 is moistened from a second roll 132 which is located in a pool of water held by the container 133 and which is rotated to carry some of said water onto the surface of roll 131. The roll 131 is made preferably of rubber and is pressed tight against roll 132 so that it is rotated therewith and the excess water is squeezed therefrom. Roll 131 is mounted in the container 133 by means duplicated at both ends which consists of the washer 134 having a boss extending into the core 135 of the roll 131, being attached thereto by a screw 136 and having a second boss extending into the ball bearing 137 held by the container 133. The other roll 132 is preferably of metal and is mounted on the tubular shaft 138 which rides in the ball bearings 139 and 140 carried by the container 133. The roll 132 is rotated at such speed as to make the peripheral speed of roller 131 the same as the speed of movement of the knife 80 by means (not shown) operating through bevel gears 141 and 142 and shaft 143. The gears 141 and 142 are enclosed in the housing 145 which is attached to the container 133 and engages the shaft 143 through ball bearings 146 and 147. The collar 148 is fastened to shaft 143 and holds it in place. The container 133 holds all of the mechanism and is itself attached to the machine by bracket 149 which is bolted to the track 18 and to a bracket 150. Bracket 150 is attached to the posts 19 and 20 and tends to hold them in a more substantial unit. The container 133 engages bracket 150 through a tongue and groove joint (Fig. 9) and is held in the desired position thereon by the gear 151 which is located in a pocket (not shown) therein. The gear 151 is screwed on the rod 152 which is fastened to the bracket 149 and is turned so as to move up or down on the rod 152 to change the position of the container 133 by gear 153. The gear 153 is attached to rod 154 and is turned manually through engagement with knob 155. The water is conducted to the container 133 through pipe 156 and passes out the overflow pipe 157.

What we claim as new and desire to secure by Letters Patent of the United States is:

1. Apparatus for severing heated vitreous tubing or rod traveling longitudinally at a uniform rate comprising an endless track having a portion adjacent the path of movement of the tubing or rod, a knife mounted on said track, means for moving the knife along the track so that it is carried into operative relation to the tubing or rod and moves along therewith for an interval and means for moving the knife into engagement with the tubing or rod and transversely to the path of travel thereof during said interval to score it.

2. Apparatus for severing heated vitreous tubing or rod traveling longitudinally at a uniform rate comprising an endless track having a portion adjacent the path of movement of the tubing or rod and having a groove adjacent one edge thereof, a carriage mounted on said track and engaging said groove, a knife mounted on said carriage, means for moving the carriage along the track so that the knife is brought into operative relation to the tubing or rod and moves along therewith for an interval and means for moving the knife into engagement with the tubing or rod and transversely to the path of travel thereof during said interval to score it.

3. Apparatus for severing heated vitreous tubing or rod traveling longitudinally at a uniform rate comprising an endless track having a portion adjacent the path of movement of the tubing or rod and having a plurality of parallel grooves adjacent one edge thereof, a plurality of rollers engaging said grooves of the track, a carriage mounted on the rollers and completely supported thereby, a knife mounted on the carriage, means for moving the carriage along the track so that the knife is brought into operative relation to the tubing or rod and moves along therewith for an interval and means for moving the knife into engagement with the tubing or rod and transversely to the path of travel thereof during said interval to score it.

4. Apparatus for severing heated vitreous tubing or rod traveling longitudinally at a uniform rate comprising an endless track having a portion adjacent the path of movement of the tubing or rod and being contained in a substantially horizontal plane, a knife mounted on said track, means located adjacent the track for dampening the knife, means for moving the knife along the track so that it is carried into engagement with said dampening means and is also moved into position above and travels with the tubing or rod and means for moving said knife into engagement with the tubing or rod so that it is at least partially severed.

5. Apparatus for severing heated vitreous tubing or rod traveling longitudinally at a uniform rate comprising an endless track having a portion adjacent the path of movement of the tubing or rod and being contained in a substantially horizontal plane, a knife mounted on said track, means located adjacent the track for dampening the knife comprising a roll, a second roll mounted against the first roll and located in a pool of water, means for turning said rolls so that the second roll carries the water onto the first roll and whatever passes therebetween is retained by the first roll, means for moving the knife along the track so that it is carried into engagement with the first roll of the dampening means and is also moved into position above and travels with the tubing or rod and means for moving said knife into engagement with the tubing or rod so that it is at least partially severed.

6. Apparatus for severing heated vitreous tubing or rod traveling longitudinally at a uniform rate comprising an endless track having a portion adjacent the path of movement of the tubing or rod, and having a plurality of parallel grooves adjacent one edge thereof, a plurality of cutting mechanisms mounted on the track each comprising a plurality of rollers engaging the grooves in the track, a carriage mounted on the rollers and completely supported thereby and a knife mounted on the carriage, means located adjacent the track for dampening the knives, an endless chain mounted adjacent the track, means for connecting the carriages to said chain, means for moving the chain so that the carriages are moved along the track and the knives are brought in turn into engagement with the dampening means and are also brought into operative relation to the tubing or rod and are moved along therewith for an interval, and means for moving the knives into engagement with the tubing or rod and transversely to the path of travel thereof during said interval to score it.

7. Apparatus for severing heated vitreous tubing or rod traveling longitudinally comprising an endless track having a portion adjacent the path of movement of the tubing or rod and located in a substantially horizontal plane, a carriage mounted on said track, an arm movably mounted on said carriage and carrying a knife thereon, means for moving said carriage along said track to bring the said knife into position above said tubing or rod and travel therewith for an interval, and an adjustable cam track mounted adjacent to the path of movement of said arm for engaging said arm and causing the knife thereon to be moved downward against said tubing or rod at a predetermined point thereon so that said tubing or rod is at least partially severed.

CARL A. BROWN.
CLARENCE E. HAHN.